United States Patent
Martinis et al.

[11] Patent Number: 6,095,727
[45] Date of Patent: Aug. 1, 2000

[54] WORKING HEAD FOR NUMERIC-CONTROL MACHINE TOOLS

[75] Inventors: Marco Martinis, Turin; Giorgio Cavallo, Borgaro Torinese, both of Italy

[73] Assignee: Vigel S.p.A., Borgaro Torinese, Italy

[21] Appl. No.: 09/140,457

[22] Filed: Aug. 26, 1998

[30] Foreign Application Priority Data

Sep. 9, 1997 [IT] Italy ................... TO970190 U

[51] Int. Cl.[7] .................. B23C 1/12; B23Q 1/12
[52] U.S. Cl. .................. 409/201; 408/53; 409/203; 409/211
[58] Field of Search ........................ 409/201, 203, 409/211, 204; 408/53

[56] References Cited

U.S. PATENT DOCUMENTS

| | | | |
|---|---|---|---|
| 1,913,781 | 6/1933 | Wiley et al. | 409/201 |
| 3,456,557 | 7/1969 | Hautau | 409/203 |
| 3,641,873 | 2/1972 | Jacques | 408/53 |
| 4,313,478 | 2/1982 | Suzuki | 409/201 |
| 4,652,190 | 3/1987 | Corsi | 409/201 |
| 4,833,764 | 5/1989 | Muller | 409/203 |
| 4,990,039 | 2/1991 | Liaw | 409/201 |
| 5,044,054 | 9/1991 | Lin | 409/201 |

*Primary Examiner*—Steven C. Bishop
*Attorney, Agent, or Firm*—Guido Modiano; Albert Josif; Daniel O'Byrne

[57] ABSTRACT

A working head for numeric-control machine tools is adapted to be moved along two or three axes relative to one or two parts mounted on respective worktables which can rotate about respective parallel axes. According to the present invention, the head supports one or preferably two tool-supporting spindles which are pivoted about a common axis which is transverse to the axes of the spindles under the actuation of motor means which are rigidly coupled to the head and are controlled by a numeric control unit.

8 Claims, 1 Drawing Sheet

WORKING HEAD FOR NUMERIC-CONTROL MACHINE TOOLS

BACKGROUND OF THE INVENTION

The present invention relates to a working head for numeric-control machine tools.

Numeric-control machining tools according to the prior art generally have a working head which is provided with one or two tool-supporting spindles which are rigidly coupled to the head, which can be moved by the machine along two or three Cartesian axes so that the tools can act on parts which are supported by one or more part-supporting worktables. The worktables can generally rotate about a generally vertical axis.

This type of equipment allows to perform drilling, milling and similar operations in a horizontal direction on the face of the part that is directed toward the head. By rotating the worktable it is also possible, for example, to produce holes which are oblique on a horizontal plane. The production of vertical or oblique holes on a vertical plane, however, requires interrupting the operations under the control of the program and releasing the part, locking it again in an inverted position. This produces downtimes which slow production and is in any case awkward because of the need for operator intervention.

SUMMARY OF THE INVENTION

The aim of the invention is to provide a working head which is more versatile than conventional ones and in particular allows to perform under program control even the above-cited operations, which are not allowed by conventional working heads.

This aim, these objects and others which will become apparent from the following detailed description are achieved by a working head for numeric-control machine tools having the characteristics disclosed.

BRIEF DESCRIPTION OF THE DRAWINGS

A preferred embodiment of the invention is now described with reference to the accompanying drawings, wherein.

DESCRIPTION OF THE PREFERRED EMBODIMENTS

Figure 1:
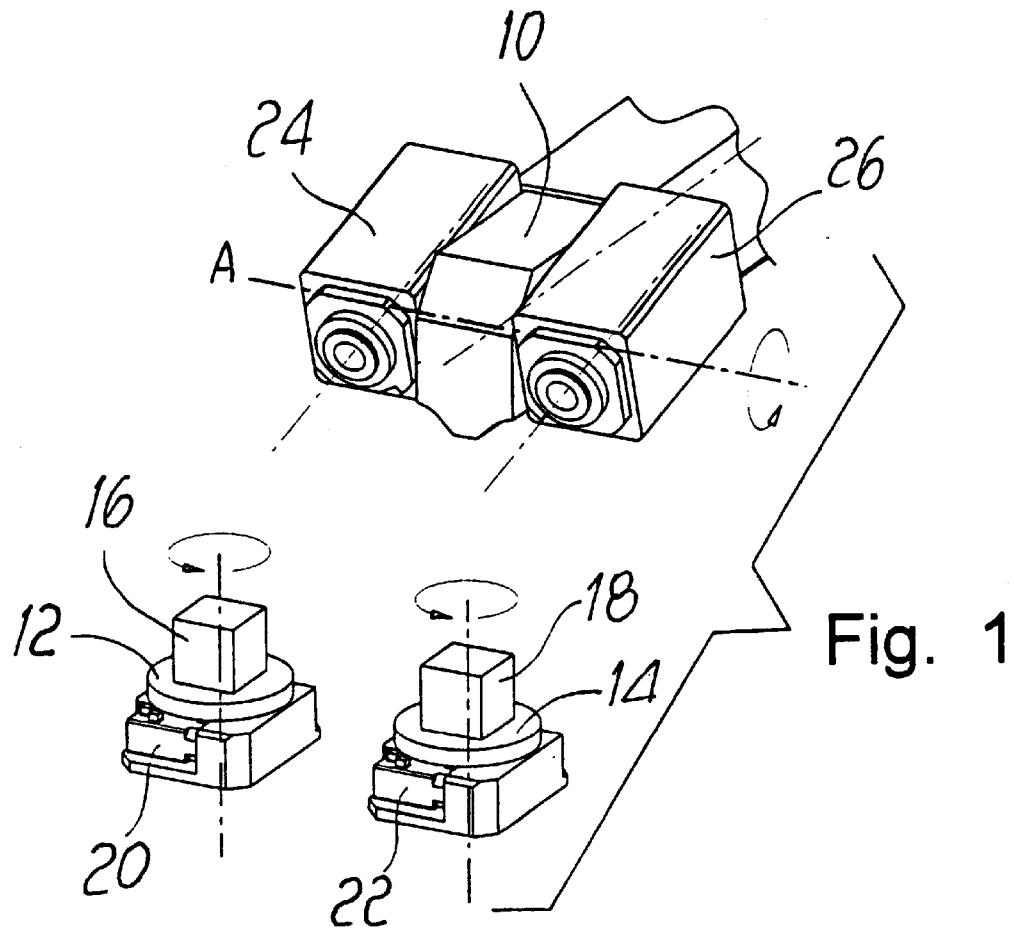
FIG. 1 is a perspective view of a working head according to a preferred embodiment of the invention in relation to two worktables of a numeric-control machine tool.

With reference to FIG. 1, the reference numeral 10 designates a working head of a numeric-control machine tool, which is not shown. The head 10 can be actuated by the machine tool with per se known means, not shown, to perform a controlled movement along three axes with respect to two worktables 12 and 14, each of which is provided with a respective part being machined 16 and 18 which is anchored by means of conventional locking means not shown in the drawings. The worktables 12 and 14 can rotate about their respective vertical axis under the actuation of respective motor means 20 and 22 as is known in the field.

Figure 2:
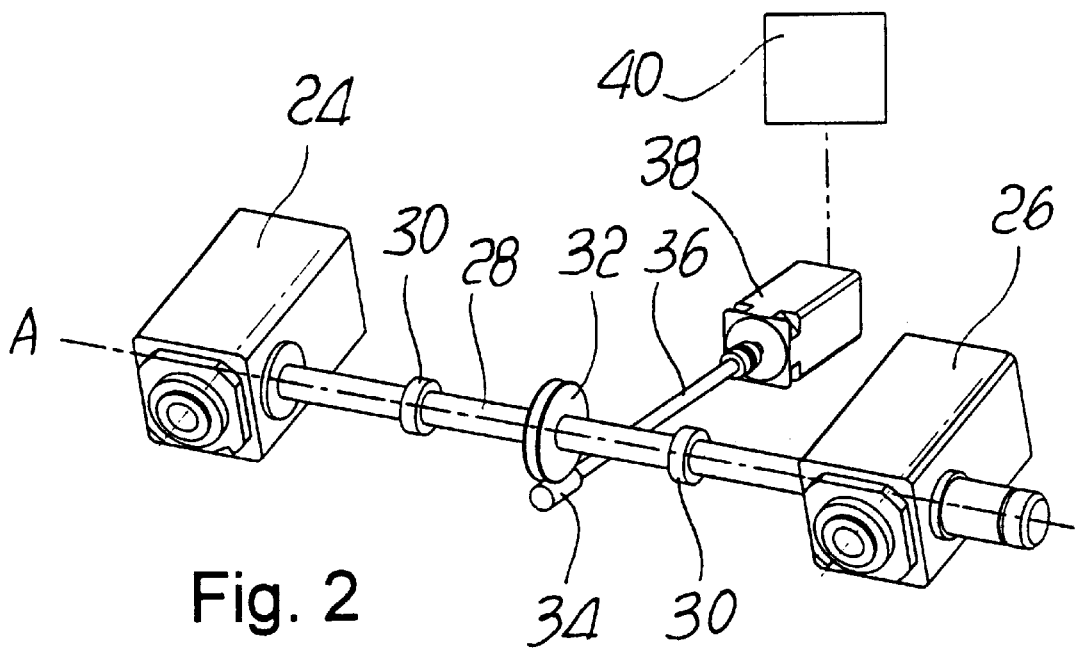
FIG. 2 is a perspective view of a preferred actuation mechanism for the spindles of the working head of FIG. 1.

The head 10 has, on opposite sides, two spindles 24 and 26 which are parallel to each other and are pivoted about a horizontal axis A, which accordingly lies transversely to the axes of the worktables 12 and 14. With reference also to FIG. 2, the spindles 24 and 26 are therefore rigidly coupled to a shaft 28 which rotates about axis A on supports 30. A helical gear 32 is keyed, in a median position, to the shaft 28 and cooperates with a worm gear 34 which is in turn keyed on a driving shaft 36 driven by motor means 38 which are controlled by a numeric control unit, schematically designated by the reference numeral 40. The motor means 38 are preferably constituted by a hydraulically actuated device with a proportional valve.

It is evident to the expert in the field that the described working head is capable of performing drilling or milling with greater versatility than conventional working heads which have fixed spindles. For example, with reference to FIG. 1, it is possible to produce horizontal holes on the face of the part that is directed toward the head, vertical holes on the face of the part that is directed upward, and inclined holes on both faces. This was not possible with conventional heads except by stopping the machining process and resuming it after releasing the parts and then locking them again in an overturned or oblique position.

The angular extent of the rotation of the spindles should conveniently be at least 90° and preferably 100–110°. More specifically, the tilting spindle should be able to rotate from a first vertical end position, in which the tool is directed downward, to a second end position which is horizontal or preferably inclined by 10–20° above the horizontal for greater machining versatility.

The above-described preferred embodiment of the invention is of course susceptible of numerous modifications and variations within the scope of the inventive concept. For example, the working head can be provided with a single spindle instead of two. The extent of the angular stroke of the spindles can also be less than 90° or can be as much as 180° in particular applications. The device for tilting the spindles can be of a different kind than the one shown. These variations and others, suitable to achieve equal utility with technically equivalent means, are to be considered as included within the scope of the protection of the invention.

The disclosures in Italian Utility Model No. TO97U000190 from which this application claims priority are incorporated herein by reference.

What is claimed is:

1. A working head for numeric-control machining tools, adapted to be moved along two or three axes relative to at least one part mounted on a worktable which can rotate about a preset axis, wherein the head supports at least one tool-supporting spindle which is mounted so that it can rotate about an axis which is transverse to an axis of a driven spindle under the actuation of motor means which are ridgy coupled to the head and are controlled by a numeric-control unit, said head supporting two spindles with parallel mutually spaced axes which are mounted so that they can rotate about a common axis, which lies transversely to the axes of the two spindles, under the actuation of said motor means, said two spindles being ridgy coupled to a shaft which is rotationally actuated about said common axis by said motor means.

2. The working head according to claim 1, wherein the extent of the allowed rotation of said two spindles about said common axis is at least 90°.

3. The working head according to claim 2, wherein the two spindles rotate about said common axis substantially from a first end position, in which the axes of the spindles are parallel to the axis of the worktable, to a second end position, in which the axes of the spindles are rotated by 90°–110° with respect to the vertical direction.

4. The working head according to claim 1, wherein said what is rotationally actuated by said motor means by means of a worm gear and a helical gear.

5. A working head for numeric-control machining tools, adapted to be moved along two or three axes relative to at least one part mounted on a worktable which can rotate about a preset axis, wherein the head supports at least one tool-supporting spindle which is mounted so that it can rotate about an axis which is transverse to an axis of a driven spindle under the actuation of a motor device which is rigidly coupled to the head and is controlled by a numeric-control unit, said head supporting two spindles with parallel mutually spaced axes which are mounted so that they can rotate about a common axis, which lies transversely to the axes of the two spindles, under the actuation of said motor device, said two spindles being rigidly coupled to a shaft which is rotationally actuated about said common axis by said motor device.

6. The working head according to claim 5, wherein the extent of the allowed rotation of said two spindles about said common axis is at least 90°.

7. The working head according to claim 5, wherein the two spindles rotate about said common axis substantially from a first end position, in which the axes of the spindles are parallel to the axis of the worktable, to a second end position, in which the axes of the spindles are rotated by 90°–110° with respect to the vertical direction.

8. The working head according to claim 5, wherein said shaft is rotationally actuated by said motor device by means of a worm gear and a helical gear.

* * * * *